(12) United States Patent
Boer et al.

(10) Patent No.: US 11,236,844 B2
(45) Date of Patent: Feb. 1, 2022

(54) SHUT-OFF DEVICE FOR A FLUID

(71) Applicant: FOCUS-ON V.O.F., Dordrecht (NL)

(72) Inventors: Adriaan Hendrik Boer, Sliedrecht (NL); Kavreet Bhangu, Bruckmühl (DE); Jeroen Martin van Klooster, Tiel (NL)

(73) Assignee: FOCUS-ON V.O.F., Dordrecht (NL)

( * ) Notice: Subject to any disclaimer, the term of this patent is extended or adjusted under 35 U.S.C. 154(b) by 0 days.

(21) Appl. No.: 16/894,471

(22) Filed: Jun. 5, 2020

(65) Prior Publication Data
US 2020/0386345 A1 Dec. 10, 2020

(30) Foreign Application Priority Data

Jun. 7, 2019 (EP) .................................... 19179095

(51) Int. Cl.
*F16K 37/00* (2006.01)
*F16K 1/32* (2006.01)
*G01S 7/52* (2006.01)
*G01S 15/08* (2006.01)

(52) U.S. Cl.
CPC ............ *F16K 37/0066* (2013.01); *F16K 1/32* (2013.01); *G01S 7/52004* (2013.01); *G01S 15/08* (2013.01)

(58) Field of Classification Search
CPC .................. G01S 7/52004; G01S 15/08; Y10T 137/8242; F16K 37/0025; F16K 37/0066; F16K 37/00; F16K 1/32
See application file for complete search history.

(56) References Cited

U.S. PATENT DOCUMENTS

| | | | | | |
|---|---|---|---|---|---|
| 4,618,824 | A | * | 10/1986 | Magee | F16K 15/03 137/554 |
| 4,762,001 | A | * | 8/1988 | Wuttke | G01S 7/52006 367/127 |
| 4,777,979 | A | * | 10/1988 | Twerdochlib | F16K 37/0041 137/554 |
| 4,782,702 | A | * | 11/1988 | Boone | G01B 17/00 137/554 |
| 4,920,802 | A | * | 5/1990 | McMullin | G01V 1/001 73/597 |

(Continued)

FOREIGN PATENT DOCUMENTS

| | | | | |
|---|---|---|---|---|
| EP | 0489596 A1 | * | 6/1992 | ............. F16K 37/00 |
| JP | 2003139589 A | | 5/2003 | |
| WO | 8803241 A1 | | 5/1988 | |

*Primary Examiner* — Jessica Cahill
(74) *Attorney, Agent, or Firm* — Whitmyer IP Group, LLC

(57) ABSTRACT

A shut-off device for a fluid includes a housing conducting the fluid, an inflow opening provided in the housing, an outflow opening provided in the housing, a flow channel formed in the housing between the inflow opening and the outflow opening, and a blocking device arranged in the flow channel. The blocking device has a blocking body receptacle and a blocking body movable in the blocking body receptacle. The flow cross-section for the fluid in the blocking device, and thus in the flow channel, can be changed by moving the blocking body in the blocking body receptacle. A reliable detection of the position of the blocking body is ensured in that an ultrasonic measuring device is arranged in or aligned on the housing such that the position of the blocking body can be determined by means of the ultrasonic measuring device.

10 Claims, 3 Drawing Sheets

(56) References Cited

U.S. PATENT DOCUMENTS

| | | | | |
|---|---|---|---|---|
| 4,977,778 A | * | 12/1990 | Nafziger | F16K 37/00 |
| | | | | 73/597 |
| 5,115,672 A | * | 5/1992 | McShane | G01F 1/7082 |
| | | | | 137/554 |
| 5,154,080 A | | 10/1992 | Hill et al. | |
| 5,159,835 A | * | 11/1992 | Nafziger | F16K 37/00 |
| | | | | 73/584 |
| 5,257,545 A | * | 11/1993 | Au-Yang | F16K 37/00 |
| | | | | 367/99 |
| 10,520,342 B2 | * | 12/2019 | Huijzer | G01F 1/662 |
| 10,697,940 B2 | * | 6/2020 | Nordstrom | G01N 29/4427 |
| 2020/0386594 A1 | * | 12/2020 | Boer | G01F 15/066 |

* cited by examiner

SHUT-OFF DEVICE FOR A FLUID

TECHNICAL FIELD

The invention relates to a shut-off device for a fluid, with a housing conducting the fluid, with an inflow opening for the fluid which inflow opening is provided in the housing and with an outflow opening for the fluid which outflow opening is provided in the housing, with a flow channel formed in the housing for the fluid between the inflow opening and the outflow opening, and with a blocking device arranged in the flow channel, wherein the blocking device has a blocking body receptacle and a blocking body movable in the blocking body receptacle, wherein the flow cross-section for the fluid in the blocking device and thus in the flow channel can be changed by moving the blocking body in the blocking body receptacle.

BACKGROUND

Shut-off devices for fluids, essentially for gaseous or liquid media, have been in use for a long time in very different technical designs, whether in processing plants (e.g. food industry, chemicals, petroleum processing) in building installations or, for example, also in medical technology and in automotive engineering including aerospace. The blocking devices of the shut-off devices are often controlled automatically in order to adjust the flow rate of the fluid flowing through the shut-off device as part of a higher-level control or regulation system. The blocking device or the blocking body of the shut-off device is then moved by an electrically, hydraulically or pneumatically driven actuator. By deflecting the blocking body in the blocking body receptacle of the shut-off device, the flow cross-section in the area of the blocking device is varied and with it the flow resistance, so that the desired effect of adjusting the flow rate is achieved.

The secure, reliable and fail-safe operation of the shut-off devices described is of great interest, especially if they are used for control purposes. In this case, for example, the blocking device is subject to particular stress, as the blocking body can be in continuous motion. The position of the blocking body can only be partially assessed from the outside, for example if an actuating device (e.g. in the form of a plunger) protrudes from the housing of the shut-off device. Another indication of the position of the blocking body can also be provided by an electric actuating device via a displacement transducer, an encoder or similar. However, this is always only indirect information which can ultimately be faulty due to various conceivable interference situations.

SUMMARY

Therefore, the object of the present invention is to provide a shut-off device for a fluid in which the position of the blocking body can be determined with increased reliability.

The previously derived object is initially and essentially achieved in the shut-off device described at the beginning in that an ultrasonic measuring device is arranged in or aligned on the housing such that the position of the blocking body can be determined by means of the ultrasonic measuring device. The ultrasonic measuring device provided inside the shut-off device enables a direct view of the blocking body in terms of measurement, i.e. of the blocking body position in the flow channel, i.e. in the fluid flow. Various properties of the sensor signal must be evaluated in order to be able to draw conclusions about the position of the blocking body depending on the design of the blocking device, for example as a valve with an axially moving valve plunger, which is moved in the blocking device more or less parallel to the flow of the medium, or, in one design of the blocking device, as a gate valve, shut-off valve or as a ball valve, in which the blocking body is usually moved perpendicular to the flow of the medium.

In the case of a preferred design of the shut-off device, a control and/or evaluation unit is provided, wherein the control and/or evaluation unit actuates the ultrasonic measuring device to emit a transmitted signal, wherein the transmitted signal is reflected at the blocking body due to the orientation of the ultrasonic measuring device. The control and/or evaluation unit detects the reflected signal and evaluates this reflected signal, whereby the position of the blocking body and/or the change in the position of the blocking body, i.e. a time derivative of the position of the blocking body, is determined.

It is provided in one preferred design that the ultrasonic measuring device has an ultrasonic transducer designed as transmitter and receiver. This variation represents the simplest implementation of the ultrasonic measuring device. It has the particular advantage that the transmitter signal and the reflected signal practically measure the same path in the flow channel, but in different directions, so that entrainment effects due to the fluid velocity are automatically averaged out.

In an alternative design of the shut-off device or of the ultrasonic measuring device arranged in the shut-off device, it is provided that the ultrasonic measuring device comprises an ultrasonic transducer designed as a transmitter and/or receiver and a further ultrasonic transducer separate therefrom designed as a receiver and/or transmitter. This implementation is more complex than the previously proposed implementation of the ultrasonic measuring device. However, the choice of such an implementation can be useful if a reflection of the transmitted signal by the blocking body for whatever reason cannot be followed back to the transmitting location.

As already mentioned, various properties of the reflected signal can be evaluated. The control and/or evaluation unit can determine the position of the blocking body, for example, by evaluating the intensity of the reflected signal. In particular, the intensity of the transmitted signal, which is usually known, can be taken into account for this purpose since the intensity of the transmitted signal can be specified very precisely by the control and/or evaluation unit. The intensity of the reflected signal is a particularly interesting variable if the blocking body of the blocking device moves vertically into the fluid flow, so that the opening through which the fluid flows is larger or smaller, depending on the position of the blocking body. If the ultrasonic measuring device is aligned such that the transmitted signal practically runs with the fluid flow to the blocking device, then the distance of the blocking body from the transmission location of the ultrasonic measuring device does not change. Depending on the position of the blocking body, only the portion of the transmitted signal that is reflected changes and thus the intensity of the reflected signal changes. The intensity of the reflected signal can be determined by evaluating the amplitude of the reflected signal, for example.

In other implementations of the blocking device, the distance between the transmission location of the ultrasonic measuring device and the blocking body of the blocking device typically changes depending on the position of the blocking body. This is the case, for example, in valve solutions where a closure part can be moved linearly towards or away from a seal seat. Due to the design, the movement of the blocking body is then essentially in the direction of the fluid flow. When the ultrasonic measuring device is aligned with such a blocking body, the distance from the transmission location of the ultrasonic measuring device to the blocking body changes with the position of the blocking body, so that distance measurement is suitable for determining the position of the blocking body. In this case, the evaluation of the reflected signal by the control and/or evaluation unit is carried out by means of transit time measurement, by determining the phase difference between the transmitted signal and the reflected signal or by determining the frequency difference between the transmitted signal and the reflected signal. Depending on the transmitted signal (it may be a modulated harmonic signal, for example), the above-mentioned variables are related to the position of the blocking element via a time derivative and may therefore not directly provide information on the position but, for example, on the speed of the blocking body. This is the case, for example, with a transmitted signal with constant frequency, where the frequency difference to the received signal is evaluated (Doppler effect). In such cases, the measurement signal must be treated mathematically in order to obtain the position of the blocking body.

In another preferred design of the shut-off device, it is provided that the control and/or evaluation unit controls the ultrasonic measuring device to emit a transmitted signal of high intensity for the purpose of cleaning the blocking device, in particular for cleaning the blocking body of the blocking device.

A further preferred design of the shut-off device according to the invention is characterized in that the position of the blocking body determined by the control and/or evaluation unit is compared to a reference position of the blocking body by the control and/or evaluation unit. This is particularly useful if there is an expected value for the deviation between the determined position and the reference position. If the deviation is too large, the control and/or evaluation unit can issue a diagnostic signal (e.g. on a display or via a fieldbus to a remote control room). This procedure is particularly useful if the reference position is expected to correspond to the determined position of the blocking body. This is the case if the reference position of the blocking body is a desired position of the blocking body and which should therefore have been set by the control and/or evaluation unit or if the reference position is a position of the blocking body determined by other means of measurement. This could, for example, originate from an actuator for the blocking body (linear displacement transducer, encoder or control pulses in the case of a stepping motor drive, etc.). The measures described make it possible to determine malfunctions and to carry out a diagnosis of the shut-off device.

Especially when the actuating position of the shut-off device is determined by ultrasonic distance measurement, it must be taken into account that the acoustic velocity and thus also the propagation velocity of the ultrasonic transmitted signal and the reflected signal depends on various factors which influence the acoustic velocity to a very different extent. In a further development of the shut-off device, it is therefore provided that the control and/or evaluation unit uses an externally predetermined value for the acoustic velocity in the fluid to determine the position of the blocking body. In this case, the acoustic velocity on whatever basis is predetermined externally, for example by a control room. This also includes that the acoustic velocity is predetermined in the control and/or evaluation unit, which is particularly practical if it can be assumed with a high degree of probability that the acoustic velocity within the fluid does not change, for example because the process parameters are kept almost constant.

In an alternative design, it is provided that the control and/or evaluation unit determines a value for the acoustic velocity in the fluid depending on a measured temperature of the fluid in order to determine the position of the blocking body. For this, a temperature sensor is provided in the housing of the shut-off device with which the fluid temperature is measured. The temperature sensor can also project into the fluid. Especially in the case of gaseous fluids, the temperature has a great influence on the acoustic velocity, so that even taking temperature dependency into account leads to a considerable improvement in the measuring accuracy of the ultrasonic measuring device. The temperature dependency of the acoustic velocity can be stored in the control and/or evaluation unit in the form of a table, a curve or a relationship in terms of a formula.

A particularly interesting alternative solution is that the control and/or evaluation unit determines the acoustic velocity in the fluid itself by means of a measurement with ultrasonic signals in the fluid conducted in the housing to determine the position of the blocking body. This solution is interesting because the acoustic velocity results directly from a measurement and no assumptions about more or less significant physical effects have to be made. The solution in terms of measurement for determining the acoustic velocity in the fluid is also particularly interesting if certain devices already exist in the shut-off device with the aid of which the acoustic velocity can also be measured without further difficulty; this will be discussed below.

In a particularly preferred design of the shut-off device, it is provided that a calibration measuring path is formed in the flow channel to determine the acoustic velocity in the fluid conducted in the housing. Objective elements of the calibration measuring path are at least one calibration ultrasonic transmitter and at least one calibration ultrasonic receiver. In a preferred configuration, the calibration measuring path also comprises at least one calibration reflector. The calibration ultrasonic transmitter and the calibration ultrasonic receiver are the respective end points of the calibration measuring path. The calibration measuring path itself is otherwise not objective, it is rather the geometrical path of the ultrasonic signal useful for measurement. The calibration reflector is used for signal deflection in the calibration measuring path. In order that the acoustic velocity in the fluid can be reliably determined, the calibration measuring path must be independent of the position of the blocking body and the calibration measuring path must be traversed by an ultrasonic measuring signal in both possible directions of the calibration measuring path. This is the only way to ensure that any entrainment effects caused by the flowing fluid cancel each other out.

In a first design for implementing the calibration measuring path, it is provided that the ultrasonic transducer of the ultrasonic measuring device designed as a transmitter forms the calibration ultrasonic transmitter and that the ultrasonic transducer of the ultrasonic measuring device designed as a receiver forms the calibration ultrasonic receiver. The advantage of this implementation is that for the implementation of the calibration measuring path at least for the transmission and reception of ultrasonic signals no device-related measures need to be taken which cannot be implemented with the ultrasonic measuring device. The only additional measure provided is that the calibration reflector is arranged adjacent to the blocking device so that the calibration reflector reflects at least part of the transmitted signal emitted by the calibration ultrasonic transmitter to the calibration ultrasonic receiver. The term "adjacent" is to be understood in this respect. The transmitted signal emitted by the calibration ultrasonic transmitter is thus partly reflected by the blocking body and partly by the calibration reflector. The calibration ultrasonic receiver receives both reflected signals and evaluates them. The acoustic velocity in the fluid can be evaluated for each measurement, but it can also be evaluated only when necessary. In any case, the acoustic velocity in the fluid results from the quotient of the known length of the calibration measuring path (calibration ultrasonic transmitter calibration reflector calibration ultrasonic receiver) and the total signal transit time for the calibration measuring path. With the now known acoustic velocity, the distance of the blocking body from the ultrasonic measuring device can be reliably determined. This distance is the product of the acoustic velocity with half the measured signal transit time on the path: calibration ultrasonic transmitter blocking body calibration ultrasonic receiver.

In a second, alternative configuration for implementing the calibration measuring path, it is provided that the calibration ultrasonic transmitter and the calibration ultrasonic receiver are each formed by an ultrasonic transducer designed as a transmitter and receiver, wherein the calibration ultrasonic transmitter and the calibration ultrasonic receiver are different from, i.e. are provided in addition to, the ultrasonic transducers of the ultrasonic measuring device. Here, the technical equipment is more complex, but there are other advantages. On the one hand, the calibration measuring path can be implemented at a distance from the blocking device, for example in an area of the flow channel with a calmer flow with less turbulence compared to the flow in the area of the blocking device, which is beneficial to the measurement accuracy. On the other hand, the already existing control and/or evaluation unit can be used for the excitation and evaluation of the ultrasonic signals of the calibration measuring path, so that practically no additional effort for signal processing is required. There is a further serious advantage, which becomes clear from the following designs.

A first design is characterized in that the calibration ultrasonic transmitter and the calibration ultrasonic receiver form a straight calibration measuring path in the inlet area, i.e. between the inflow opening and the blocking device, or in the outlet area, i.e. between the blocking device and the outflow opening of the flow channel. The calibration ultrasonic transmitter and the calibration ultrasonic receiver are thus opposite each other. Preferably, the straight calibration measuring path measures the flow channel such that it passes through the center of the flow cross-section or, in any case, runs close to the center; in this way, the largest possible cross-section of the flow channel is measured.

A further design is characterized in that the calibration ultrasonic transmitter, the calibration ultrasonic receiver and the calibration reflector form a V-shaped calibration measuring path in the inlet area, i.e. between the inflow opening and the blocking device, or in the outlet area, i.e. between the blocking device and the outflow opening of the flow channel. Preferably, the V-shaped calibration measuring path measures the flow channel such that the legs of the calibration measuring path pass through the center of the flow cross-section or, in any case, run close to the center; in this way, the largest possible cross-section of the flow channel is measured.

A particular advantage results from the further development of the shut-off device if the control and/or evaluation unit carries out a transit time measurement via the calibration measuring path and determines the flow velocity by means of the transit time measurement. In this way, a shut-off device with an integrated flow meter can be implemented without additional technical equipment. The control and/or evaluation unit preferably provides a measuring channel through which the acoustic velocity, the flow rate and the position of the blocking body can be determined.

It is then also advantageous if the calibration ultrasonic transmitter is also designed as a calibration ultrasonic receiver and the calibration ultrasonic receiver is also designed as a calibration ultrasonic transmitter. Measurement signals can then be transmitted and received such that they can pass through the calibration measuring path in the two possible opposite directions of flow, for example once with the direction of flow and once against the direction of flow of the medium, if the calibration measuring path has a path component in the direction of flow.

BRIEF DESCRIPTION OF THE DRAWINGS

As explained, there are various possibilities for designing and further developing the shut-off device according to the invention. Preferred embodiments are described in the following detailed description on the basis of the drawings.

DETAILED DESCRIPTION

Figure 1A:
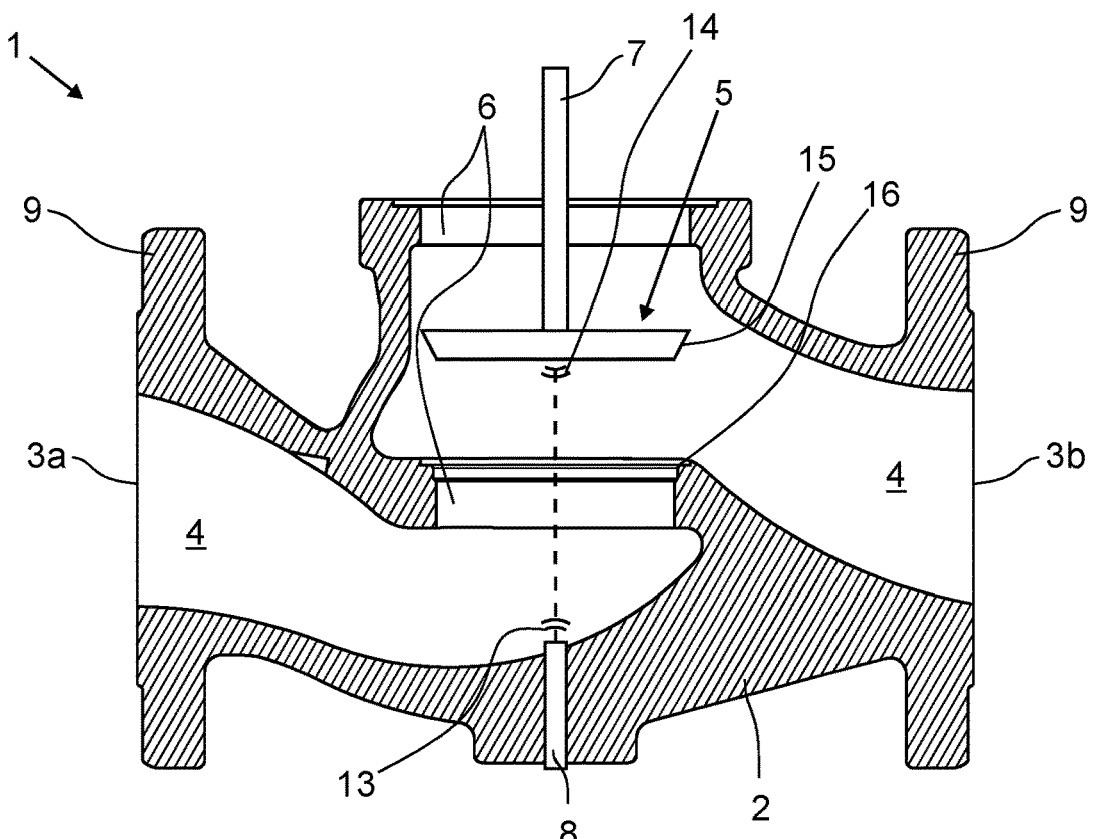
FIGS. 1A-1B illustrate an embodiment of a shut-off device according to the invention with an ultrasonic measuring device.
Figure 1B:
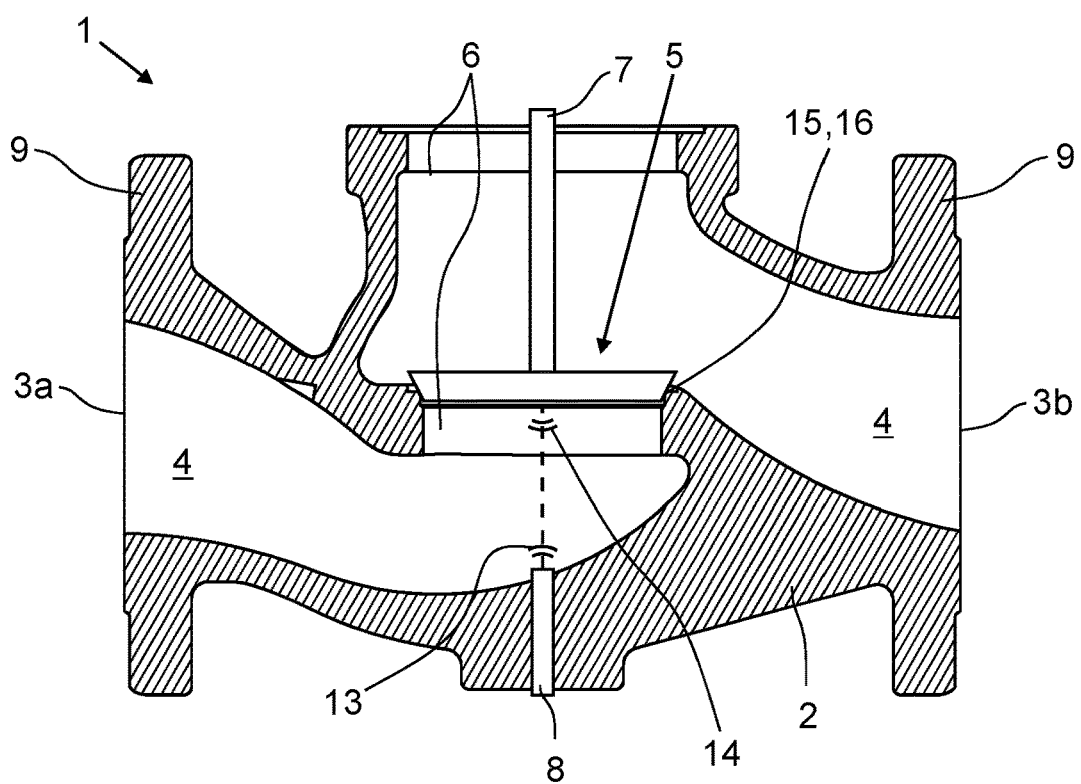
Figure 2:
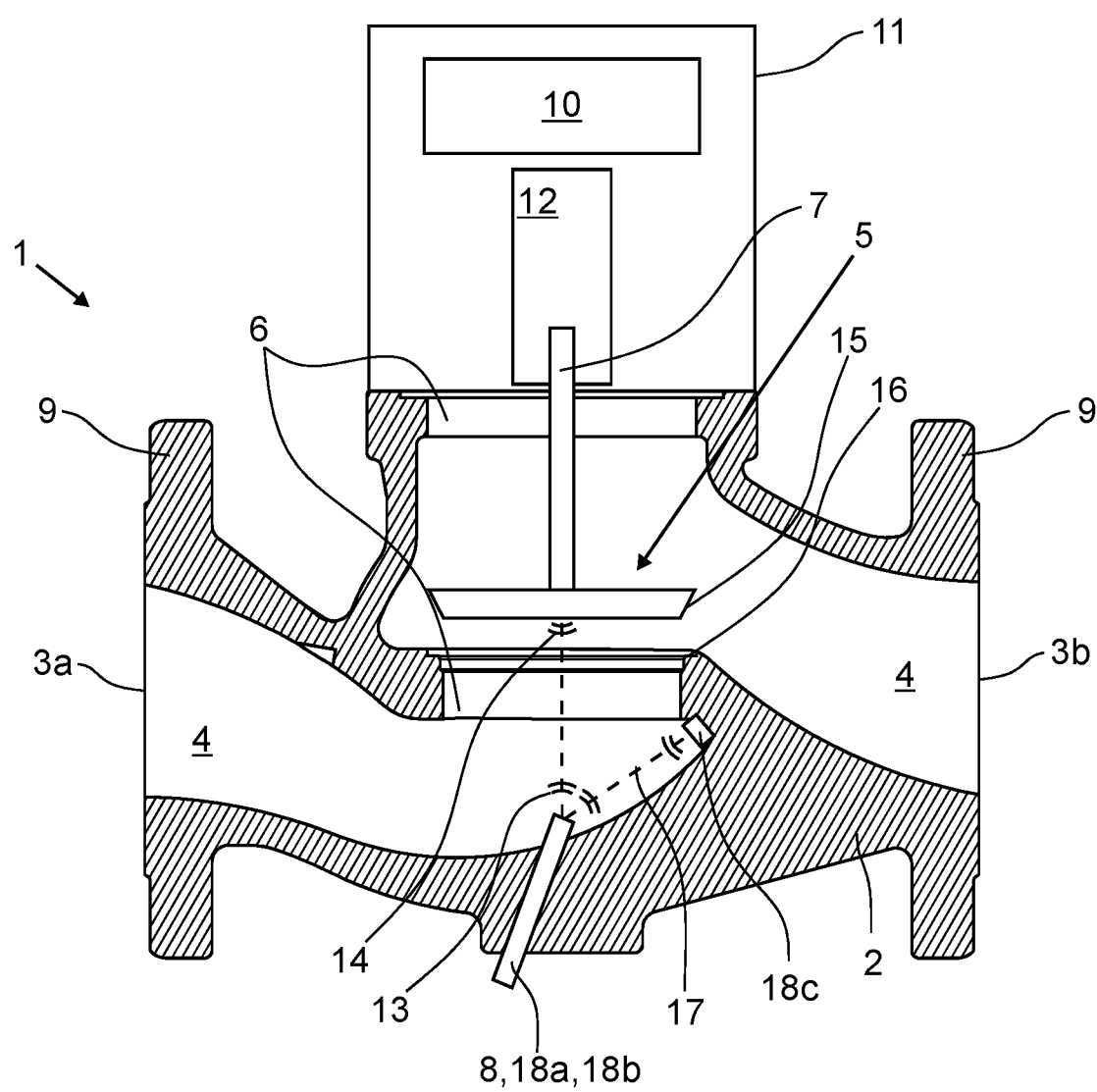
FIG. 2 illustrates a further embodiment of a shut-off device according to the invention with an ultrasonic measuring device and a calibration measuring path.
Figure 3:
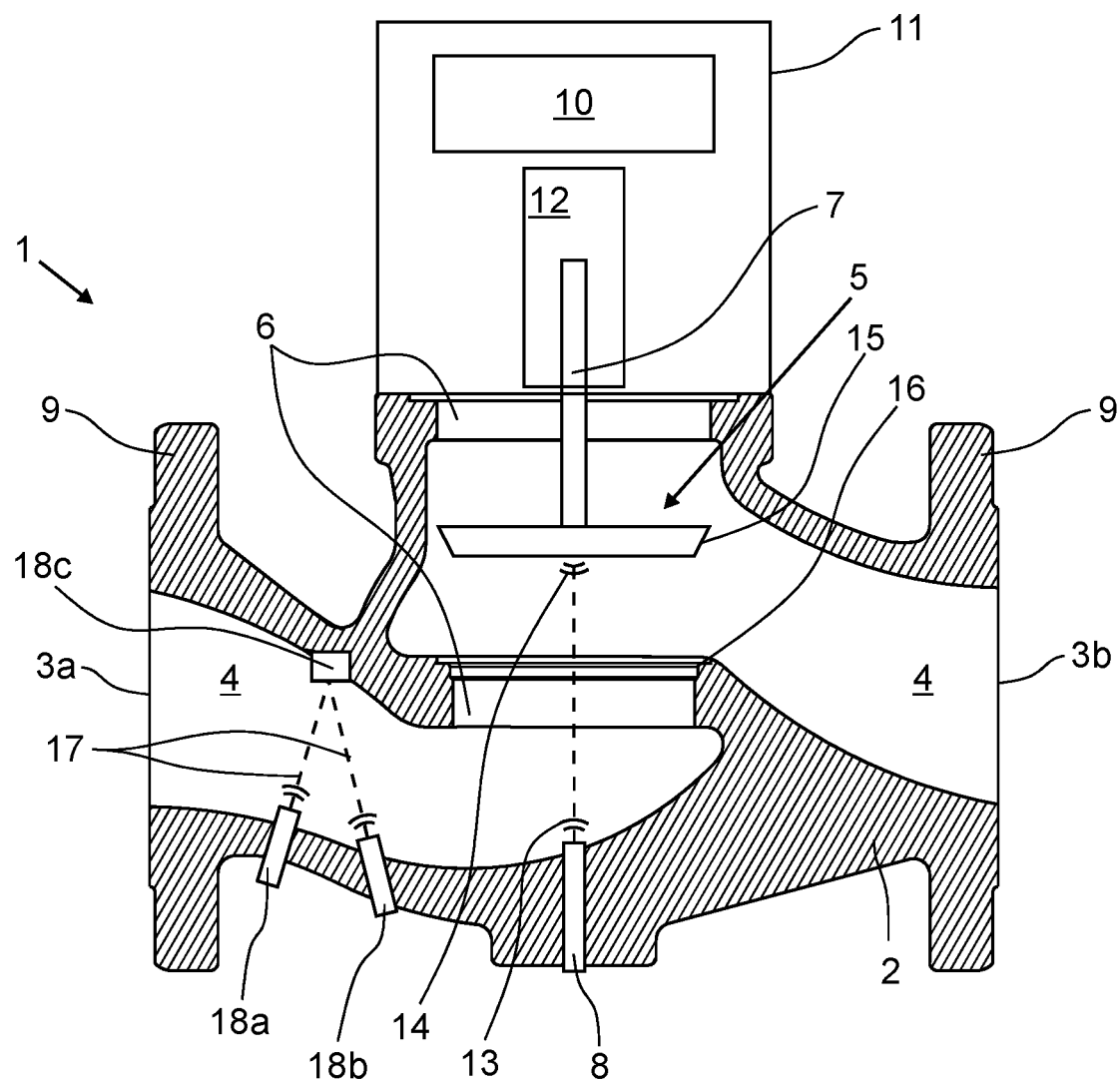
FIG. 3 illustrates an embodiment of a shut-off device according to the invention with an ultrasonic measuring device and a calibration measuring path, wherein the calibration measuring path also serves to measure the volume flow.

FIGS. 1 to 3 each show a shut-off device 1 for a fluid, with a housing 2 conducting the fluid, with an inflow opening 3a for the fluid provided in the housing 2 and with an outflow opening 3b for the fluid provided in the housing 2, with a flow channel 4 for the fluid formed in the housing 2 between the inflow opening 3a and the outflow opening 3b and with a blocking device 5 arranged in the flow channel 4. In the embodiments shown, the direction of flow thus runs from left to right. The blocking device 5 has a blocking body receptacle 6 and a movable blocking body 7 in the blocking body receptacle 6. By moving the blocking body 7 in the blocking body receptacle 6, the flow cross-section for the fluid in the blocking device 5 and thus in the flow channel 4 can be changed. In the embodiments shown, the flow pattern in the blocking device 5 has a vertical component, which is directed from bottom to top in the figures. In the area of the inflow opening 3a and the outflow opening 3b, flange connections 9 are provided with which the shut-off device can be connected to an external process.

In all embodiments, an ultrasonic measuring device 8 is arranged and aligned in the housing, here in an outer wall of the housing, such that the position of the blocking body 7 can be determined with the ultrasonic measuring device 8. By aligning the ultrasonic measuring device 8 with the blocking body 7, here in particular with the sealing component of the blocking body 7, a direct measurement of the position of the blocking body 7 is possible. The measurement of the position of the blocking body 7 is therefore carried out from the inside of the shut-off device 1, i.e. from the flow channel 4.

FIGS. 1A and 1B show how the blocking body 7 is movably mounted in the blocking body receptacle 6, here in the form of a linear movement, in the embodiments this is vertically oriented. In FIG. 1A, the flow path in the blocking device 5 is open, in FIG. 1B the flow path through the blocking device 5 is closed, so that a flow through the blocking device 1 is completely prevented.

In FIG. 2 and FIG. 3 it is shown that the shut-off device 1 is equipped with a control and/or evaluation unit 10. Here, the control and/or evaluation unit 10 is accommodated in a housing extension 11 of the housing 2, in which an actuator 12 for the blocking body 7 of the blocking device 5 is also arranged.

The control and/or evaluation unit 10 controls the ultrasonic measuring device 8 for emitting a transmitted signal 13. The transmitted signal 13 is reflected at the blocking body 7 and the control and/or evaluation unit 10 detects the reflected signal 14. Then, the control and/or evaluation unit 10 determines the position of the blocking body 7 by evaluating at least the reflected signal 14.

In all the embodiments shown, the ultrasonic measuring device 8 has an ultrasonic transducer designed as a transmitter and receiver. This design is always possible if it can be ensured that the reflected signal 14 can be reflected back to the transmitting location. Alternatively, the ultrasonic measuring device 8 can have an ultrasonic transducer designed as a transmitter and a separate ultrasonic transducer designed as a receiver; however, this is not shown here.

The control and/or evaluation units 10 shown in FIGS. 2 and 3 are designed such that the position of the blocking body 7 is determined by it by measuring the transit time of the transmitted signal 13 and the reflected signal 14. In the present case, the control and/or evaluation unit 10 is implemented with a digital signal processor. The figures do not show in detail how the ultrasonic measuring device 8 is connected to the control and/or evaluation unit 10. However, there must, of course, be a signal connection between the ultrasonic measuring device 8 and the control and/or evaluation unit 10. However, how this is implemented in detail is not of interest here.

Furthermore, the control and/or evaluation units 10 shown in FIGS. 2 and 3 are designed such that they compare the position of the blocking body 7 determined by them with a reference position of the blocking body 7, wherein the reference position of the blocking body 7 is a desired position of blocking body 7. In FIG. 3, the desired position is calculated independently by the control and/or evaluation unit 10 by calculating a control algorithm. In FIG. 2 the control and/or evaluation unit 10 receives the desired position from an external source, namely from a higher-level control room, which is not shown here.

In the embodiments shown in FIGS. 1 to 3, the blocking device 5 is designed as a valve with an axially movable closure part with a sealing surface 15 as a blocking body 7 and with a seal seat 16 formed in the blocking body receptacle 6 for sealing with the sealing surface 15 of the blocking body 7 in the closed state.

In FIG. 1, the control and/or evaluation unit is not shown for space reasons, nevertheless it could be provided additionally as shown in FIGS. 2 and 3. In this case, the control and/or evaluation unit would use an externally specified value for the acoustic velocity in the fluid to determine the position of blocking body 7, as there is no possibility of determining the acoustic velocity independent of the position of blocking body 7. For this, the distance between the ultrasonic measuring device 8 and the blocking body 7 would have to be assumed to be known.

In the embodiments in FIGS. 2 and 3, the control and/or evaluation unit 10 for determining the position of the blocking body 7 determines the acoustic velocity in the fluid by means of a measurement with ultrasonic signals in the fluid conducted in housing 2 itself. This is made possible in that a calibration measuring path 17 is formed in the flow channel 4 for determining the acoustic velocity in the fluid conducted in the housing 2, with a calibration ultrasonic transmitter 18a, a calibration ultrasonic receiver 18b and with a calibration reflector 18c, wherein the calibration measuring path 17 is independent of the position of the blocking body 7 and the calibration measuring path 17 is traversed by a measuring signal in both possible directions of passage.

The embodiment according to FIG. 2 is characterized in that the ultrasonic transducer of the ultrasonic measuring device 5, designed as a transmitter, forms the calibration ultrasonic transmitter 18a, that the ultrasonic transducer of the ultrasonic measuring device 5, designed as a receiver, forms the calibration ultrasonic receiver 18b and that the calibration reflector 18c is arranged adjacent to the blocking device 5, so that the calibration reflector 18c reflects at least a part of the transmitted signal 13 emitted by the calibration ultrasonic transmitter 18a to the calibration ultrasonic receiver 18b. In addition, in FIG. 2 the calibration ultrasonic transmitter 18a and the calibration ultrasonic receiver 18b are designed as one common ultrasonic transmitter and receiver. This solution has a very low device-related expenditure. However, it must be possible to meet the condition that the blocking body 7 and the calibration reflector 18c are able to be arranged in the immediate vicinity so that both elements can be mutually impinged by a transmitted signal 14 or a measuring signal from the location of the ultrasonic transmitter. It must also be possible to align the calibration reflector 18c so that it reflects its reflected signal back in the direction of the ultrasonic transmitter.

The embodiment according to FIG. 3 is designed differently with respect to the calibration measuring path 17. Here, the calibration ultrasonic transmitter 18a and the calibration ultrasonic receiver 18b are formed by one ultrasonic transducer each designed as transmitter and receiver, wherein the calibration ultrasonic transmitter 18a and the calibration ultrasonic receiver 18b are different from ultrasonic transducers of the ultrasonic measuring device 8. This solution is more complex in terms of equipment than the variation shown in FIG. 2, but it has other considerable advantages, for example that the calibration measuring path 17 can be implemented at a distance from the blocking device 5. In FIG. 3 this is in the area between the inflow opening 3a and the blocking device 5, because the flow is less disturbed here than in the area of the blocking device 5.

A further advantage in the embodiment according to FIG. 3 is that the control and/or evaluation unit 10 is designed such that it carries out a transit time measurement via the calibration measuring path 17 and determines the flow velocity of the fluid in the flow channel 4 by means of transit time measurement. Thus, a flow measurement is realized simultaneously. The shut-off device 1 designed in this manner is therefore particularly suitable for control engineering purposes where the controlled variable is the flow rate.

In FIG. 3, the calibration ultrasonic transmitter 18a, the calibration ultrasonic receiver 18b and the calibration reflector 18c form a V-shaped calibration measuring path 17 in the inlet area, i.e. between the inflow opening 3a and the blocking device 5. This configuration of the measuring path has proven to be particularly suitable for flow applications with shut-off devices.

The invention claimed is:

1. A shut-off device for a fluid, comprising:
a housing conducting the fluid;
an inflow opening for the fluid, which opening is provided in the housing;
an outflow opening for the fluid, which opening is provided in the housing;
a flow channel formed in the housing for the fluid between the inflow opening and the outflow opening; and
a blocking device arranged in the flow channel, wherein the blocking device has a blocking body receptacle and a blocking body movable in the blocking body receptacle;
wherein a flow cross-section for the fluid in the blocking device, and thus in the flow channel, is changeable by moving the blocking body in the blocking body receptacle;
wherein an ultrasonic measuring device is arranged in or aligned on the housing such that a position of the blocking body is determinable using the ultrasonic measuring device;
wherein the shut-off device further comprises a control and/or evaluation unit, wherein the control and/or evaluation unit controls the ultrasonic measuring device to emit a transmitted signal, the transmitted signal is reflected at the blocking body and the control and/or evaluation unit detects the reflected signal and determines the position of the blocking body and/or a change in the position of the blocking body by evaluating at least the reflected signal;
wherein the control and/or evaluation unit determines an acoustic velocity in the fluid itself using a measurement with ultrasonic signals in the fluid conducted in the housing to determine the position of the blocking body; and
wherein a calibration measuring path is formed in the flow channel for determining the acoustic velocity in the fluid conducted in the housing, with at least one calibration ultrasonic transmitter, at least one calibration ultrasonic receiver and at least one calibration reflector, wherein the calibration measuring path is independent of the position of the blocking body and the calibration measuring path is traversed by a measuring signal in both possible traversing directions.

2. The shut-off device according to claim 1, wherein the ultrasonic measuring device has an ultrasonic transducer designed as a transmitter and receiver, or the ultrasonic measuring device has an ultrasonic transducer designed as a transmitter and a separate ultrasonic transducer designed as a receiver.

3. The shut-off device according to claim 1, wherein the position of the blocking body is determined by the control and/or evaluation unit by one of evaluating an intensity of the reflected signal, by measuring a transit time, by determining a phase difference between the transmitted signal and the reflected signal or by determining a frequency difference between the transmitted signal and the reflected signal.

4. The shut-off device according to claim 1, wherein the control and/or evaluation unit controls the ultrasonic measuring device for emitting a transmitted signal for cleaning the blocking body of the blocking device.

5. The shut-off device according to claim 1, wherein the position of the blocking body determined by the control and/or evaluation unit is compared to a reference position of the blocking body by the control and/or evaluation unit; and
wherein the reference position of the blocking body is a desired position of the blocking body or a position of the blocking body determined by other means.

6. The shut-off device according to claim 1, wherein the blocking device is designed as a valve with an axially movable closure part with a sealing surface as blocking body and with a seal seat formed in the blocking body receptacle for sealing with the sealing surface of the blocking body in a closed state, or the blocking device is designed as a gate valve, shut-off valve or as a ball valve.

7. The shut-off device according to claim 1, wherein an ultrasonic transducer of the ultrasonic measuring device designed as a transmitter forms the calibration ultrasonic transmitter, an ultrasonic transducer of the ultrasonic measuring device designed as a receiver forms the calibration ultrasonic receiver, and the calibration reflector is arranged adjacent to the blocking device so that the calibration reflector reflects at least part of a transmitted signal emitted by the calibration ultrasonic transmitter to the calibration ultrasonic receiver.

8. The shut-off device according to claim 1, wherein the calibration ultrasonic transmitter and the calibration ultrasonic receiver are each formed by an ultrasonic transducer designed as a transmitter and receiver, wherein the calibration ultrasonic transmitter and the calibration ultrasonic receiver are different from ultrasonic transducers of the ultrasonic measuring device.

9. The shut-off device according to claim 8, wherein the calibration ultrasonic transmitter, the calibration ultrasonic receiver and the calibration reflector form a V-shaped calibration measuring path in an inlet region between the inflow opening and the shut-off device, or in an outlet region between the shut-off device and the outflow opening of the flow channel.

10. The shut-off device according to claim 1, wherein the control and/or evaluation unit carries out a transit time measurement via the calibration measuring path and determines a flow velocity using the transit time measurement.

* * * * *